(12) United States Patent
Zhang et al.

(10) Patent No.: US 8,347,180 B2
(45) Date of Patent: Jan. 1, 2013

(54) DATA STORAGE SYSTEM AND METHOD

(75) Inventors: Bo Zhang, Beijing (CN); Honggang Chai, Beijing (CN); Liang Chen, Beijing (CN)

(73) Assignee: VIA Technologies, Inc., Hsin-Tien, Taipei (TW)

( * ) Notice: Subject to any disclaimer, the term of this patent is extended or adjusted under 35 U.S.C. 154(b) by 324 days.

(21) Appl. No.: 12/783,698

(22) Filed: May 20, 2010

(65) Prior Publication Data
US 2011/0113281 A1 May 12, 2011

(30) Foreign Application Priority Data
Nov. 12, 2009 (CN) .......................... 2009 1 0212398

(51) Int. Cl.
*G11C 29/00* (2006.01)
(52) U.S. Cl. ................... 714/763; 714/718; 714/724
(58) Field of Classification Search ............ 714/763, 714/224, 718, 42, 29, 8, 7, 6, 5
See application file for complete search history.

(56) References Cited

U.S. PATENT DOCUMENTS

| | | | | |
|---|---|---|---|---|
| 5,887,146 A | * | 3/1999 | Baxter et al. | 710/104 |
| 6,026,461 A | * | 2/2000 | Baxter et al. | 710/244 |
| 6,505,305 B1 | * | 1/2003 | Olarig | 714/5.11 |
| 2004/0202034 A1 | | 10/2004 | Lee | |

FOREIGN PATENT DOCUMENTS

CN 1551244 12/2004

OTHER PUBLICATIONS

English language translation of abstract of CN 1551244 (published Dec. 1, 2004).

* cited by examiner

*Primary Examiner* — Fritz Alphonse
(74) *Attorney, Agent, or Firm* — McClure, Qualey & Rodack, LLP

(57) ABSTRACT

A data storage system includes a first memory, a controller, a counting module, and a checking and correcting module. Copyback operations are performed in the first memory. The controller couples the first memory to the counting module and the checking and correcting module. The counting module provides a counting operation for the copyback operations at different logic addresses of the first memory and, according to a counting result of the counting operation, determines whether a checking and correcting requirement has been satisfied by any of the logic addresses. The checking and correcting module receives data read out from the first memory, wherein the received data corresponds to a satisfying logic address, and checks the received data and corrects the received data when it is checked that the received data is incorrect, to correct the first memory accordingly.

20 Claims, 7 Drawing Sheets data storage system

| Logic Address | Counting Result |
|---|---|
| LBA(0) | $m_0$ |
| LBA(1) | $m_1$ |
| LBA(2) | $m_2$ |
| ..... | ..... |
| LBA(p) | $m_p$ |

FIG. 3

DATA STORAGE SYSTEM AND METHOD

CROSS REFERENCE TO RELATED APPLICATIONS

This application claims priority of China Patent Application No. 200910212398.4, filed on Nov. 12, 2009, the entirety of which is incorporated by reference herein.

BACKGROUND OF THE INVENTION

1. Field of the Invention

The present invention relates to data storage systems and data storage methods, and in particular relates to data storage of memories with copyback operations.

2. Description of the Related Art

Conventional data storage devices include hard discs and optical discs. Today, new data storage techniques have been developed. For example, solid state discs (SSD), a substitute for hard discs, use NAND flashes for data storage. The NAND flash is widely used in portable electronic devices. For example, in an mp3 audio player, the NAND flash is used as a popular storage medium.

A copyback operation, or named internal copy, is a common operation of NAND flashes. FIG. 1 depicts the structure of a NAND flash and shows how a copyback operation works on the NAND flash.

As shown, a NAND flash 100 has a plurality of blocks (numbered $block_0$, $block_1$ ... $block_n$) and a buffer 102. The buffer 102 is designed for the copyback operation. The blocks $block_0$ ... $block_n$ provide physical spaces for data storage. Each block can be divided into a plurality of pages. For example, in FIG. 1, the block $block_0$ includes a plurality of pages page(0, 0), page(0, 1) ..., the block $block_1$ includes a plurality of pages page(1, 0), page(1, 1) ..., and the block$_n$, includes a plurality of pages page(n, 0), page(n, 1) .... To write or read the NAND flash, a "Logic Address", used in the host, has to be mapped to a "Physical Address" which addresses a physical space of the NAND flash 100. Each physical space may be a block, a page or even a smaller storage unit of the NAND flash 100.

Note that mapping between the logic address and the physical address is dynamic mapping. In some cases, data may be moved from one physical space to another physical space without changing its corresponding logical address. The copyback operation is one of the cases and may be utilized in various applications. For example, garbage collection, which frees physical spaces and makes the physical spaces clear for data storage, usually relies heavily on the copyback operation. Garbage collection may free physical spaces block by block. Referring to FIG. 1, to free the physical space of a $block_1$, the valid data originally contained in the $block_1$ has to be copied to another block such as $block_n$, for backup before erasing $block_1$ and marking $block_1$ as a free physical space to write on. A data backup is provided by the copyback operation. As FIG. 1 shows, to use page(n, 1) of $block_n$ to backup the valid data of page(1, 0) of $block_1$, the copyback operation may first transmit the valid data from page(1, 0) to the buffer 102 and then transmit it from the buffer 102 to page(n, 1). Data transmission is an internal operation within the NAND flash 100 and a user is not aware of errors during the copyback operation.

In another case, the copyback operation is restricted within a page, wherein the data of one physical space (original space) of a page is copied to another physical space (destination space) of the same page. In such a case, data is first copied from the original space to a buffering space within the page and is then copied from the buffering space to the destination space. Similarly, data transmission is an internal operation within a NAND flash and a user is not aware of the errors during the copyback operation.

Because the user is not aware of the errors in the copyback operation, the data error may be accumulated during the following copyback operations and become un-repairable.

BRIEF SUMMARY OF THE INVENTION

The invention discloses data storage systems and data storage methods.

An exemplary embodiment of the data storage system comprises a first memory, a controller, a counting module, and a checking and correcting module. Copyback operations are performed in the first memory. The controller couples the first memory to the counting module and to the checking and correcting module. The counting module provides a counting operation for the copyback operations at different logic addresses of the first memory and, based on the counting result of the counting operation, determines whether a checking and correcting requirement has been satisfied by any of the logic addresses. The checking and correcting module receives data read out from the first memory, wherein the received data corresponds to a satisfying logic address which satisfies the checking and correcting requirement, and checks, or checks and corrects the received data. The first memory is refreshed accordingly.

An exemplary embodiment of the data storage method of the invention is applied in a first memory where copyback operations are performed. The method may perform a counting operation for copyback operations at different logic addresses of the first memory. According to the counting result of the counting operation, the method may determine whether a checking and correcting requirement has been satisfied by any of the logic addresses. Then, the method receives data read out from the first memory, wherein the received data corresponds to a satisfying logic address which satisfies the checking and correcting requirement. The received data is checked, or checked and corrected if necessary, and the first memory is refreshed accordingly.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 3 shows a table containing counting result of a counting operation;

DETAILED DESCRIPTION OF THE INVENTION

The following description shows several exemplary embodiments of the invention. This description is made for the purpose of illustrating the general principles of the invention and should not be taken in a limiting sense. The scope of the invention is best determined by reference to the appended claims.

Figure 1:
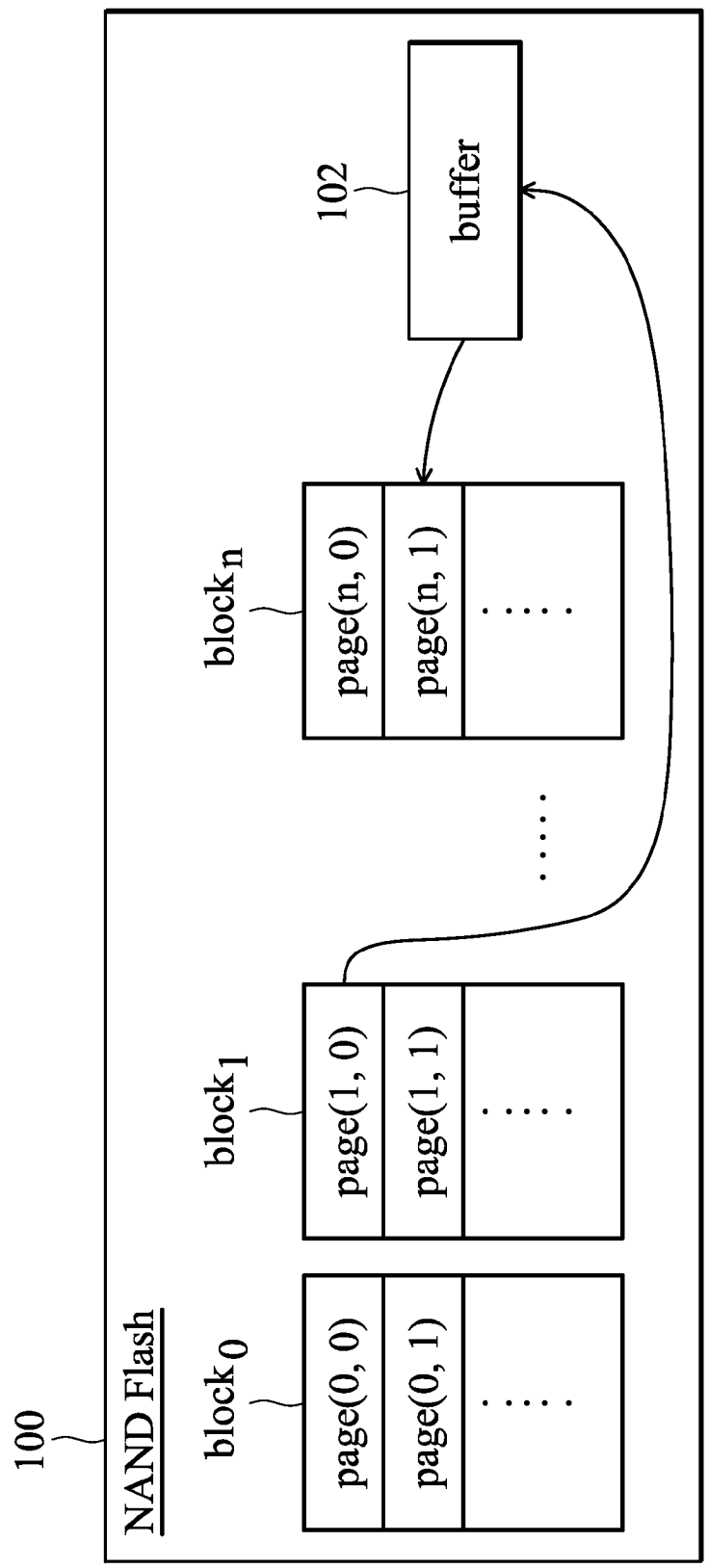
FIG. 1 depicts the structure of a NAND flash and shows how a copyback operation works on the NAND flash.
Figure 2:
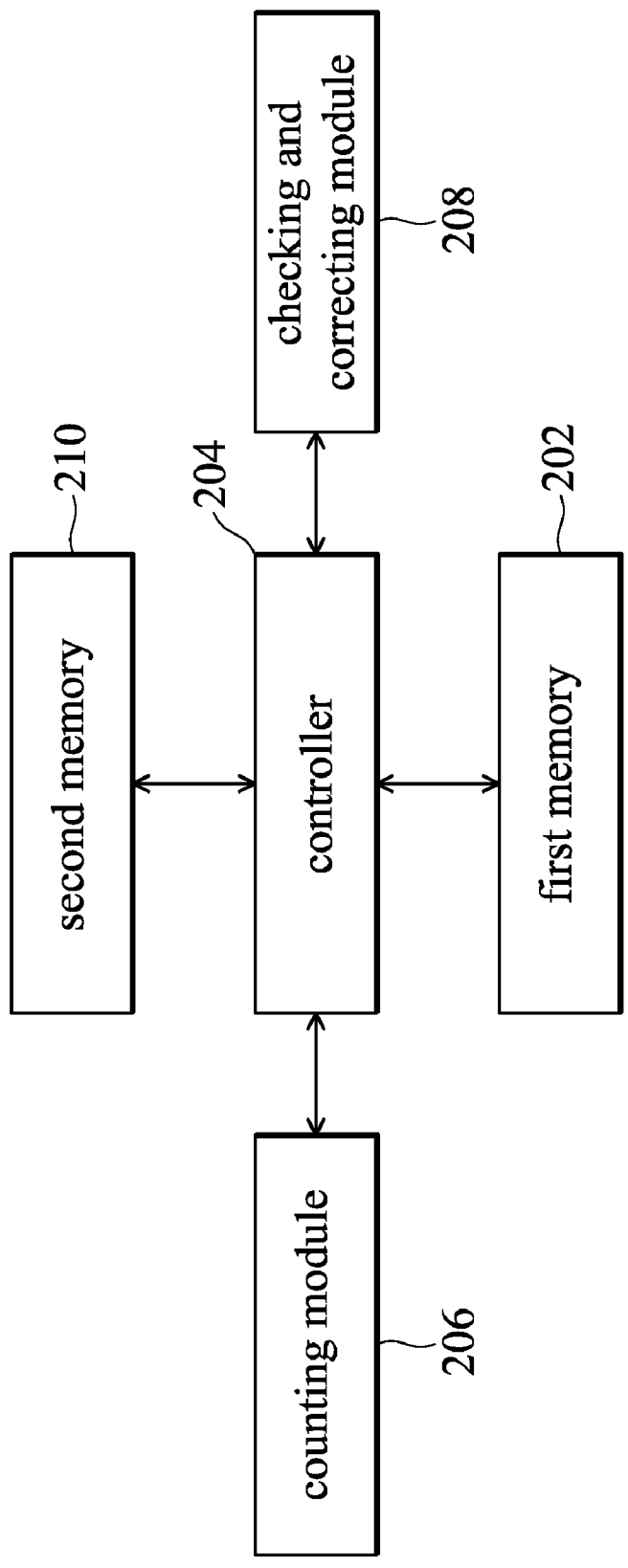
FIG. 2 depicts an exemplary embodiment of a data storage system.

FIG. 2 depicts an exemplary embodiment of a data storage system. The system comprises a first memory 202, a controller 204, a counting module 206, a checking and correcting module 208 and a second memory 210.

Copyback operations are allowed in the first memory 202. The physical space of the first memory 202 is dynamically allocated to correspond to a plurality of logical addresses. The first memory 202 may be a NAND flash, and is coupled to the counting module 206, checking and correcting module 208 and the second memory 210 via the controller 204. The counting module 206 provides a counting operation for copyback operations at different logic addresses of the first memory. According to the counting result of the counting operation, the counting module 206 determines whether a checking and correcting requirement has been satisfied by any of the logic addresses. The data stored according to the satisfying logic address is read out from the first memory 202 to be checked, or checked and corrected by the checking and correcting module 208. The checking and correcting module 208 receives the data which is stored according to the satisfying logic address and read out from the first memory 202, then checks the data, and corrects the data when there is an error, to refresh the first memory 202 accordingly. The second memory 210 is an optional component, and is designed to record the counting result generated by the counting operation of the counting module 206. The second memory 210 may be a dynamic random access memory (DRAM).

The counting result may show how frequently the copyback operations are performed at different logic addresses. The counting operation can be realized in different ways.

In an exemplary embodiment, the counting operation may count the times of copyback operations at each logic address. The result of the counting operation (named counting result) may be recorded in the second memory 210 as a table. FIG. 3 shows an exemplary embodiment of the table. In this case, logic addresses LBA(0) ... LBA(p) relate to a number $m_0 ... m_p$, respectively, where $m_0 ... m_p$ represents the times of copyback operations at the logic addresses LBA(0) ... LBA(p) respectively. According to the counting result $m_0 ... m_p$ stored in the second memory 210, the counting module 206 determines whether more than a predetermined times of copyback operations have occurred at any of the logic addresses. If any of the logic addresses has more than a predetermined times of copyback operations, it means that a logic address satisfies a checking and correcting requirement and the corresponding data should be read out from the first memory 202 to be checked and corrected. In a case wherein the predetermined times is 8, the counting results $m_0 ... m_p$ each require 3 bits. If each logic address needs a 3-bits space to store the corresponding counting result, a considerable amount of space in the second memory 210 may be required to record all the counting results $m_0 ... m_p$.

Thus, an alternative embodiment of the counting operation is provided to reduce the size of the second memory 210. In this case, each logic address relates to a counting result named a frequency indicator (may be a one-bit). Each time a copyback operation occurs, the frequency indicator of a corresponding logic address is assigned a value based on a probability technique. Thus the counting result at each logic address may be recorded by only one-bit. For example, the default of each frequency indicator may be '0', and a frequency indicator changing probability X is introduced to change the frequency indicator from default '0' to '1' accordingly. Based on the frequency indicator changing probability X, when every n times of copyback operations occur at one logic address, there should be a probability of P % to trigger the checking of the data stored according to the logic address, that is, to make the logic address satisfy the checking and correcting requirement. Every time a copyback operation occurs, an attempt is made to change the frequency indicator of the corresponding logic address to '1' according to the frequency indicator changing probability X. That is, according to formula as following:

$$1-(1-X)^n = P\% \qquad [1]$$

where X may be $1-(1-P\%)^{(1/n)}$. In a case wherein a user wants when every 10 copyback operations occur at one logic address, there is 90% probability to check the data of the logic address (which means n=10, P %=90%), the frequency indicator changing probability X may be 0.206 according to formula [1]. When the times of the copyback operations n varies between 9 to 11, the frequency indicator changing probability X may be between 0.226 to 0.268 according to the formula [1] and, for engineering convenience, the frequency indicator changing probability X may be set to 0.25. Thus, every time a copyback operation occurs, the counting module 206 may attempt to change the frequency indicator from '0' to '1' according to the probability of 25%. The frequency indicators for the logic addresses may be recorded in a table similar to that shown in FIG. 3. For example, $m_0 ... m_p$ each may be a one-bit value, representing frequency indicators corresponding to the logic addresses LBA(0) ... LBA(p). According to the frequency indicators $m_0 ... m_p$ stored in the second memory 210, the counting module 206 determines whether there is a frequency indicator matching a specific value, such as '1'. The counting module 206 determines that the logic address corresponding to the matched frequency indicator satisfies a checking and correcting requirement and the data stored according to the logic address has to be read out from the first memory 202 for checking, or checking and correcting.

In another exemplary embodiment, a random number generator (not shown in FIG. 2) is deployed in the counting module 206 to set the frequency indicators. The generated random number may be 0 ... 99. In some embodiments, a uniform white noise random number may be obtained by a random number generator according to the system time or CPU time indicator, or, directly generated by a random number generator realized by hardware. By obtaining a modulus of the uniform white noise random number (dividing the uniform white noise random number by 100 to obtain a remainder), a random number ranged over 0~99 may be generated. Comparing the random number with a threshold value (for example, the threshold value may be 25), the frequency indicator (default '0') of the logic address (at which a copyback operation occurs) may be changed to '1' when the random number is smaller or equivalent to the threshold value, and may be maintained at its default '0' when the random number is greater than the threshold value. Consequently, every time a copyback operation is performed, the frequency indicator of the corresponding logic address may be changed to '1' according to the probability of 25%. When a frequency indicator is changed to '1', it means that there is a possibility of 90% that the corresponding logic address has performed copyback operations for 10 times. Also, the counting module 206 determines that the checking and correcting requirement has been satisfied at the logic address, so that the data stored according to the logic address has to be read out from the first memory 202 for checking, or checking and correcting.

The checking, or checking and correcting operation may be realized in different ways. In an exemplary embodiment, error checking and correcting (ECC) is applied. In such a case, the stored data further include an ECC code. An ECC action is applied in the checking and correcting module 208 of FIG. 2. The data stored according to the logic address conforming to the checking and correcting requirement is named "data to be checked." The controller 204 will read out the data from the first memory 202 and may temporarily store the data to the second memory 210 to be accessed by the checking and correcting module 208 for the ECC actions.

Figure 4A:
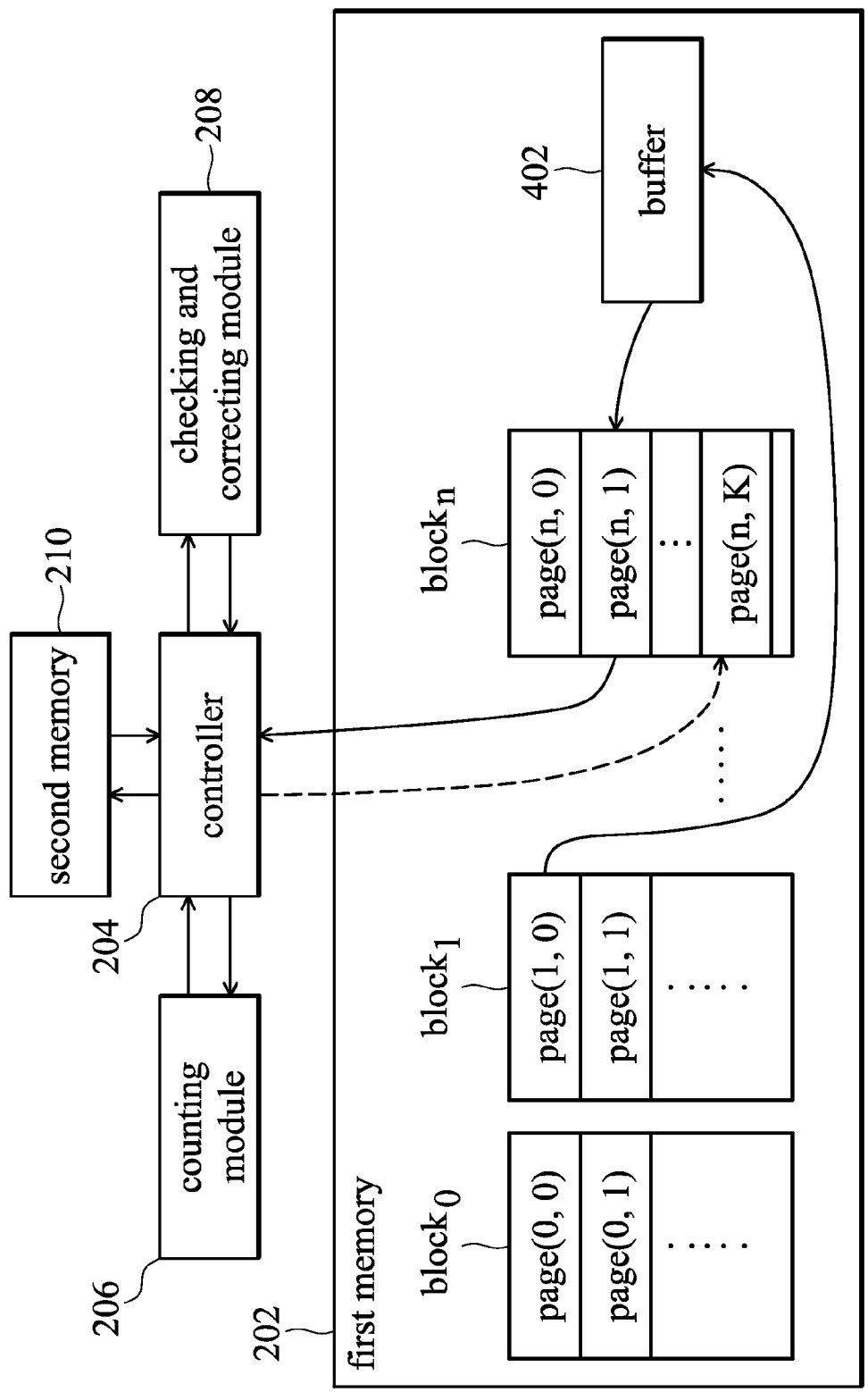
FIGS. 4A and 4B depict different data paths of a data storage technique.
Figure 4B:
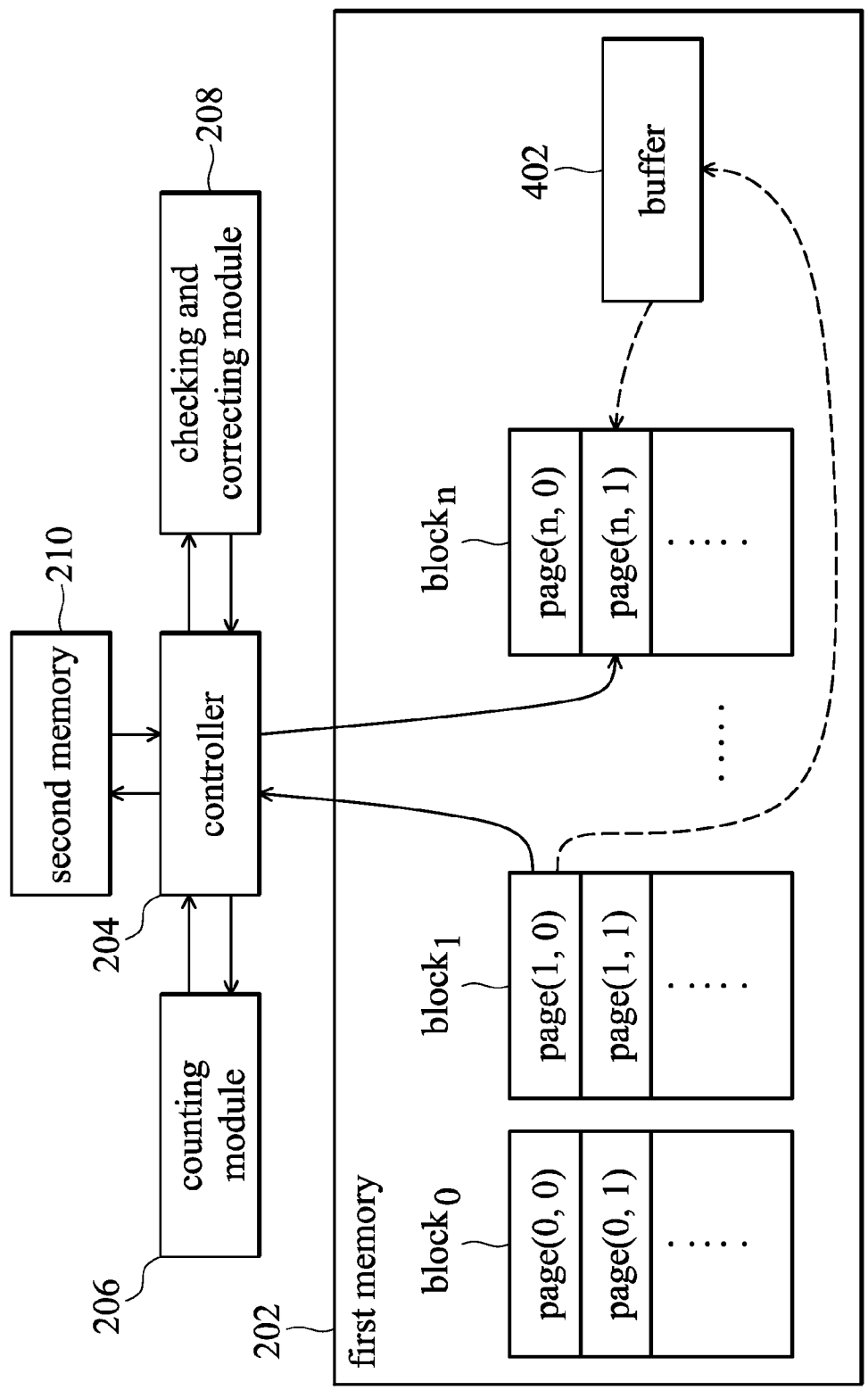

The checking, or checking and correcting procedure may be performed immediately after an instant copyback operation that triggers the data checking, or may be performed when a next copyback operation after the instant copyback operation that triggers the data checking is indicated to occur at the same logic address. FIGS. 4A and 4B depict different data paths.

Referring to FIG. 4A, the checking, or checking and correcting procedure occurs immediately after the instant copyback operation that triggers the data checking FIG. 4A shows that the instant copyback operation is performed by using the buffer 402 to buffer the data originally contained in the page page(1, 0) and then writing into page(n, 1) with the data of the buffer 402. If the counting module 206 determines that the corresponding logic address satisfies the checking and correcting requirement after the instant copyback operation, the controller 204 retrieves the first memory 202 at the page page(n, 1) for the data corresponding to the logic address and temporarily stores the retrieved data in the second memory 210 to be checked, or checked and corrected by the checking and correcting module 208. When determining that the data is incorrect, the checking and correcting module 208 corrects the data and refreshes the first memory 202 with the corrected data. As shown, in the case wherein the first memory 202 is a NAND flash, a free physical space (e.g., page (n, K) of block$_n$) in the first memory 202 is allocated to store the corrected data and the data of the logic address is refreshed accordingly in the first memory 202. The dashed line represents the storing of the corrected data. On the contrary, when the checking and correcting module 208 determines that the data is correct, the actions shown by the dashed line are omitted and the user can obtain the correct data from the page page(n, 1).

Referring to FIG. 4B, when the counting module 206 determines that any logic address satisfies the checking and correcting requirement, the checking procedure or the checking and correcting procedure is performed when a next copyback operation after the instant copyback operation that triggers the data checking is indicated to occur at the same logic address. As shown in FIG. 4B, when the controller 204 determines that another copyback operation (next copyback operation) is required at the satisfying logic address, the operation of the solid line, depicting the data movement provided by the combined operations, will be performed to replace the operation of the dashed line depicting the conventional next copyback operation. The data stored in the physical space page(1, 0) is read out from the first memory 202 by the controller 204 and is temporarily stored in the second memory 210 to be checked, or to be checked and corrected by the checking and correcting module 208. After the checking, or checking and correcting procedures, the controller 204 transmits the processed data to the copyback destination page(n, 1), a free physical space in the first memory 202. As shown, the next copyback operation is replaced by the process of writing the checked, or checked and corrected data back to the first memory 202, which means when a logic address satisfies the checking and correcting requirement after an instant copyback operation, and then it is indicated to be performed a next copyback operation, the next copyback operation will be suspended and will be replaced by the process of checking, or checking and correcting, and then writing the checked, or checked and corrected data back to the first memory 202.

The counting module 206 and checking and correcting module 208 of FIG. 2 may be independent of the controller 204, or may be embedded within the controller 204. The counting module 206 and the checking and correcting module 208 may be hardware circuits controlled by the controller 204 or may be software or firmware run by the controller 204. For example, the counting module 206 and the checking and correcting module 208 may be firmware controlling the first memory 202, which is run by the controller 204. In some embodiment, a software/hardware codesign may be applied to the design of the counting module 206 and the checking and correcting module 208.

Figure 5A:
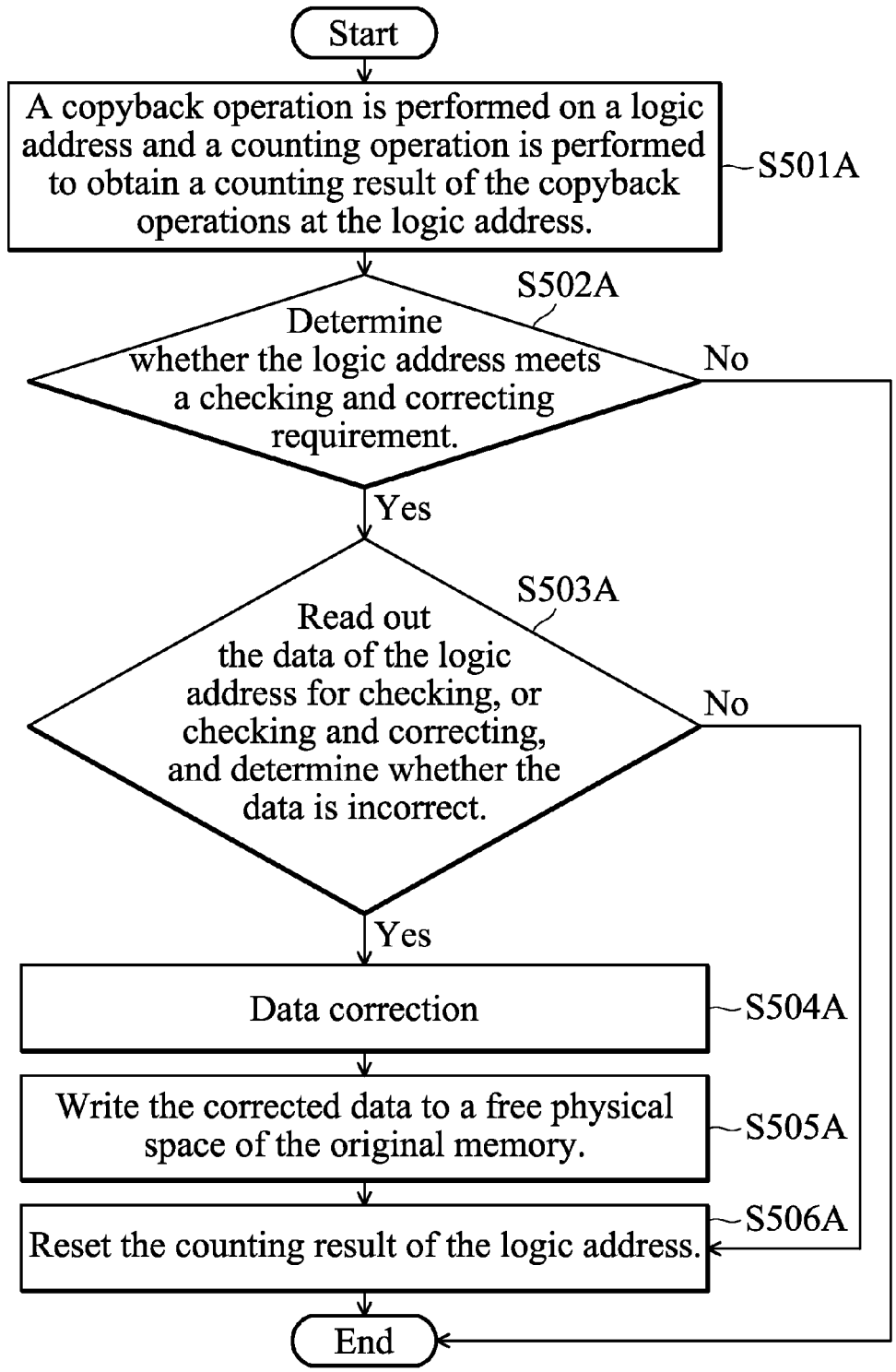
FIGS. 5A and 5B show flow charts of the embodiments of the data storage methods, and reference may be made to FIGS. 4A and 4B, respectively.
Figure 5B:
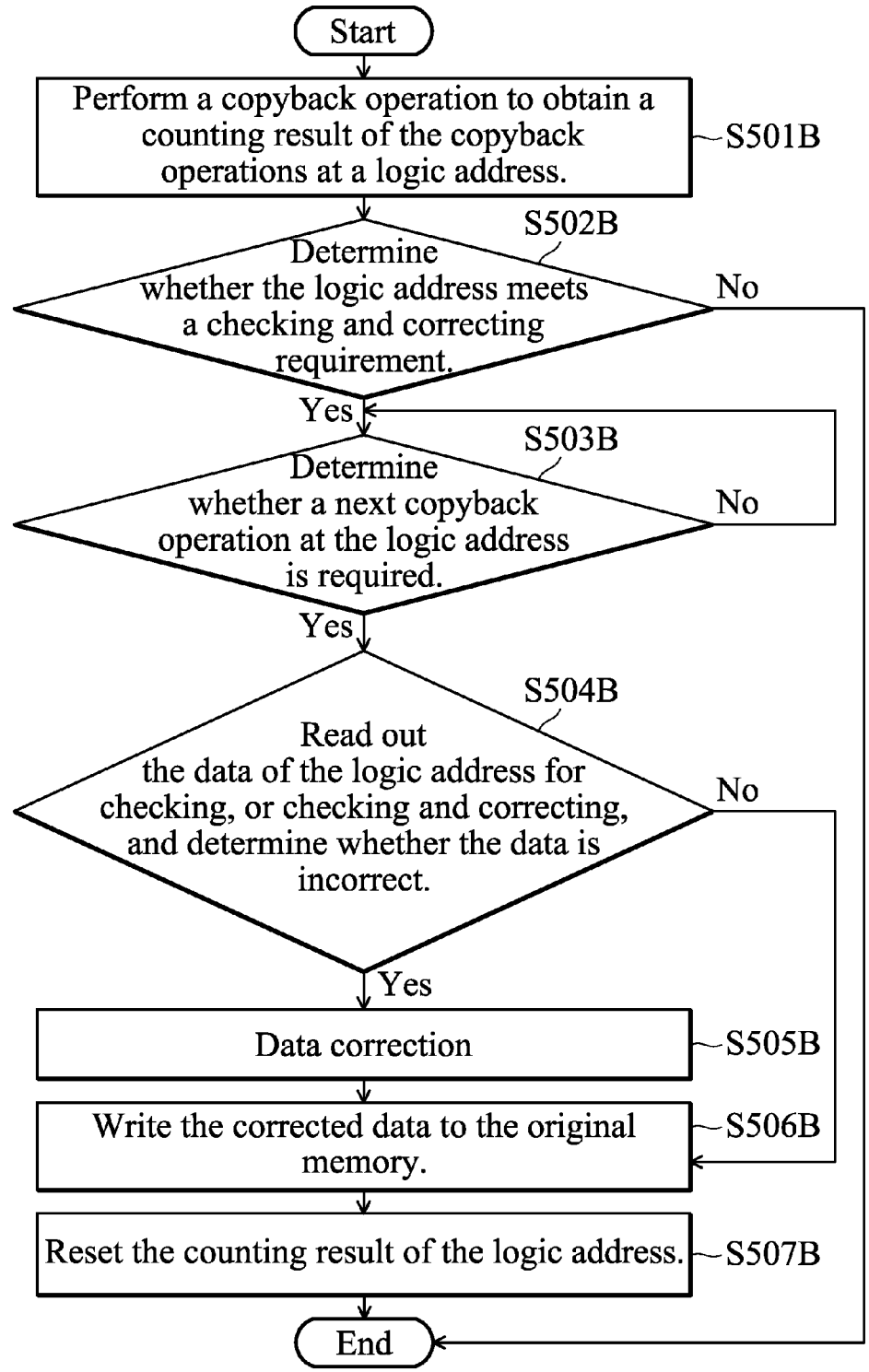

The specification further discloses data storage methods to be applied to the said first memory 202. The method may perform a counting operation on a plurality of logic addresses relating to the first memory 202 to gather the counting result of copyback operation on the logic addresses. According to the gathered counting result of the counting operation, the method may determine whether any of the logic addresses meet the checking and correcting requirement. When the checking and correcting requirement has been satisfied by any of the logic addresses, the method reads out the data (stored according to the logic address) out from the first memory 202 and checks, or checks and corrects the obtained data, and stores the correct data back to the first memory 202. The method may further use a second memory (such as the second memory 210 of FIG. 2) to temporarily store the counting result of the counting operation. The counting, checking and correcting techniques of the method may be accomplished by the aforementioned techniques. FIGS. 5A and 5B show flow charts of the embodiments of the data storage methods and their relation to those shown in FIGS. 4A and 4B, respectively.

Referring to FIG. 5A, an embodiment of data storage methods is disclosed, and reference may be made to FIG. 4A. In step S501A, a copyback operation is performed on a logic address (referring to FIG. 4A, data stored in the page page(1, 0) is copied and written into page(n, 1)) and a counting operation is performed to obtain a counting result of the copyback operations at a logic address. In step S502A, it is determined whether the logic address satisfies a checking and correcting requirement. For example, according to the counting result of the copyback operations at the logic address, it is determined whether more than N times of copyback operations have occurred at the logic address, wherein N is a threshold value determined by the user, or it is determined whether the counting result matches a specific value, such as '1', wherein the counting result is a frequency indicator. When the checking and correcting requirement is satisfied, step S503A is performed, wherein the data of the logic address that has been moved to page(n, 1) is read out from the first memory 202 and temporarily stored in the second memory 210 to be checked, or checked and corrected. If step S503A determines that the data of the logic address is incorrect, step S504A is performed and the data is corrected (for example, by an ECC technique). In step S505A, the corrected data is written to a free physical space of the first memory 202 (such as page(n, K)) to refresh the first memory 202. The steps S504A and S505A may be bypassed when the step S503A determines that the data of the logic address is correct. Step S506A is used to reset the counting result of the logic address.

In step S506A, the counting result of the logic address (which may be stored in the second memory 210) may be reset to zero.

Referring to FIG. 5B, an embodiment of data storage methods is disclosed, and reference may be made to FIG. 4B. In step S501B, a counting operation is performed to obtain a counting result of the copyback operations at a logic address. In step S502B, it is determined whether a checking and correcting requirement has been satisfied by the logic address. For example, when more than N times of copyback operations have occurred at the logic address, wherein N is a threshold value, the procedure goes to step S503B. In step S503B, it is determined whether another copyback operation (next copyback operation) is required at the logic address. Note that before a next copyback operation, the controller 204 is not idle and it may execute other instructions or perform other operations. When it is determined that the next copyback operation (referring to FIG. 4B, for moving data from page (1, 0) to page (n, 1)) is going to be performed at the same logic address at step S503B, the procedure executes step S504B to read the data of page (1, 0) out from the first memory 202 and to temporarily store the retrieved data in the second memory 210 for data checking, or checking and correcting. When it is determined that the data of the logic address is incorrect in step S504B, a data correction (such as ECC technique) is performed at step S505B. In step S506B, the corrected data, which may be the output of the checking and correcting module 208 of FIG. 4B, is written to the first memory 202 (written to a free physical space, for example, page(n, 1) of FIG. 4B). On the contrary, when it is determined that the data is correct in step S504B, the data correction of step S505B may be bypassed and the procedure may go to step S506B to rewrite the data to a free physical space of the first memory 202 (for example, page(n, 1) of FIG. 4B). The procedures may end at step S507B—a reset procedure for the counting result of the logic address. The counting result of the logic address at which the checking and correcting requirement has been satisfied has to be reset at the end of the procedures.

Comparing the flowcharts of FIGS. 5A and 5B, the data storage method described by FIG. 5B accomplishes a copyback data movement by a novel way rather than the conventional ones. As shown, when the checking and correcting requirement has been satisfied by a logic address, the technique of FIG. 5B suspends the data checking and correcting until a next copyback operation is required at the same logic address. Instead of the original action of the next copyback operation, the data of the logic address is read out from the first memory 202 for data checking, or checking and correcting. After the data checking, or checking and correcting, the data (that has been corrected or does not require correction) is written back to the first memory 202 and thereby the data movement of the next copyback operation is accomplished. Thus, a fewer times of first memory rewriting is required. The lifespan of the first memory is extended. As for the techniques of FIG. 5A, writing data from the second memory 210 to the first memory 202 is omitted when the data is correct and so the system efficiency is better if most of the copyback operations are correct.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage system, comprising:
   a first memory, where copyback operations are performed;
   a controller, coupling the first memory to a counting module and a checking and correcting module;
   the counting module, providing a counting operation for copyback operations at different logic addresses of the first memory and, based on a counting result of the counting operation, determining whether a checking and correcting requirement has been satisfied by any of the logic addresses; and
   the checking and correcting module, receiving data read out from the first memory, wherein the received data corresponds to a satisfying logic address which satisfies the checking and correcting requirement, and, checking the received data and correcting the received data when it is checked that the received data is incorrect, to correct the first memory accordingly.

2. The data storage system as claimed in claim 1, wherein the controller is further coupled to a second memory, and the second memory is operative to temporarily store the counting result of the counting operation.

3. The data storage system as claimed in claim 1, wherein the counting operation counts the times of the copyback operations occurring at each of the logic addresses.

4. The data storage system as claimed in claim 3, wherein the logic address at which more than a predetermined times of copyback operations have occurred is determined as the satisfying logic address that satisfies the checking and correcting requirement.

5. The data storage system as claimed in claim 1, wherein the counting operation sets a frequency indicator of each logic address according to a frequency indicator changing probability every time the copyback operation is performed at the corresponding logic address.

6. The data storage system as claimed in claim 5, wherein each frequency indicator includes one-bit information.

7. The data storage system as claimed in claim 5, wherein when any of the frequency indicators is set to a predetermined value, the corresponding logic address is determined as the satisfying logic address that satisfies the checking and correcting requirement.

8. The data storage system as claimed in claim 1, wherein:
   the checking and correcting module determines whether the received data is incorrect, then corrects the received data and writes the corrected received data to a free physical space of the first memory for data refreshing if the received data is incorrect.

9. The data storage system as claimed in claim 1, wherein:
   before the received data is read out from the first memory, the controller determines whether a next copyback operation is required at the satisfying logic address;
   if the next copyback operation is required at the satisfying logic address, the checking and correcting module determines whether the received data is incorrect, then corrects the received data and writes the corrected received data to a free physical space of the first memory if the received data is incorrect, or writes the received data to the free physical space of the first memory if the received data is correct.

10. The data storage system as claimed in claim 9, wherein the next copyback operation is suspended.

11. The data storage system as claimed in claim 1, wherein the first memory is a NAND flash.

12. A data storage method, for a first memory where copyback operations are performed, wherein the method comprises:

providing a counting operation for copyback operations at different logic addresses of the first memory;

determining whether a checking and correcting requirement has been satisfied by any of the logic addresses according to a counting result of the counting operation; and receiving data read out from the first memory, wherein the received data corresponds to a satisfying logic address which satisfies the checking and correcting requirement, and checking the received data and correcting the received data when it is checked that the received data is incorrect, to refresh the first memory accordingly.

13. The data storage method as claimed in claim 12, wherein after the steps of checking the received data and correcting the received data when it is checked that the received data is incorrect, the counting result of the satisfying logic address is reset.

14. The data storage method as claimed in claim 12, wherein the counting operation counts the times of the copyback operations occurring at each of the logic addresses.

15. The data storage method as claimed in claim 14, wherein the logic address at which more than a predetermined times of copyback operations have occurred is determined as the satisfying logic address that satisfies the checking and correcting requirement, where N is a number.

16. The data storage method as claimed in claim 12, wherein the counting operation sets a frequency indicator of each logic address according to a frequency indicator changing probability every time the copyback operation is performed at the corresponding logic address.

17. The data storage method as claimed in claim 16, wherein when any of the frequency indicators is set to a predetermined value, the corresponding logic address is determined as the satisfying logic address that satisfies the checking and correcting requirement.

18. The data storage method as claimed in claim 12, wherein when the step of checking determines that the received data is incorrect, the step of correcting corrects the received data and writes the corrected received data to a free physical space of the first memory.

19. The data storage method as claimed in claim 12, wherein:

before the received data is read out from the first memory, determining whether a next copyback operation is required at the satisfying logic address;

if the next copyback operation is required at the satisfying logic address, the step of checking determines whether the received data is incorrect, the step of correcting corrects the received data and writes the corrected received data to a free physical space of the first memory if the received data is incorrect, or writes the received data to the free physical space of the first memory if the received data is correct.

20. The data storage method as claimed in claim 19, wherein the next copyback operation is suspended.

* * * * *